United States Patent [19]
Slonim

[11] Patent Number: 6,073,183
[45] Date of Patent: Jun. 6, 2000

[54] TRANSPARENT COMMUNICATION WITH MULTIPLE DEVICES OVER A SINGLE SERIAL OR PARALLEL PORT OF A COMPUTER

[75] Inventor: Edwin Slonim, Haifa, Israel

[73] Assignee: Intel Corporation, Santa Clara, Calif.

[21] Appl. No.: 08/805,582

[22] Filed: Feb. 25, 1997

Related U.S. Application Data

[63] Continuation of application No. 08/414,096, Mar. 31, 1995, abandoned.

[51] Int. Cl.[7] .................................................. G06F 13/14
[52] U.S. Cl. ............................... 709/310; 710/3; 710/4; 710/5
[58] Field of Search ............................... 395/859, 883, 395/841, 681, 830; 710/3–12, 300–305; 709/300–305

[56] References Cited

U.S. PATENT DOCUMENTS

| | | | |
|---|---|---|---|
| 4,760,525 | 7/1988 | Webb | 712/2 |
| 5,537,558 | 7/1996 | Fletcher et al. | 395/309 |
| 5,611,055 | 3/1997 | Krishan et al. | 39/281 |
| 5,675,831 | 10/1997 | Caputo | 395/830 |
| 5,790,895 | 8/1998 | Krotz et al. | 395/884 |
| 5,812,820 | 9/1998 | Loram | 395/500 |
| 5,815,682 | 9/1998 | Williams et al. | 395/500 |
| 5,901,325 | 5/1999 | Cox | 395/821 |

*Primary Examiner*—Alvin E. Oberley
*Assistant Examiner*—St. John Courtenay, III
*Attorney, Agent, or Firm*—Blakely, Sokoloff, Taylor & Zafman LLP

[57] ABSTRACT

A method for allowing communication of data between one or more peripheral devices coupled to a computer and one or more applications running on the computer in an interleaved fashion. The configuration of a physical port of the computer is read to determine what peripheral devices are attached to the computer. The communication between the applications and the physical port is controlled using an envelope attached to the data being transmitted between the applications and the peripheral devices.

33 Claims, 12 Drawing Sheets

TRANSPARENT COMMUNICATION WITH MULTIPLE DEVICES OVER A SINGLE SERIAL OR PARALLEL PORT OF A COMPUTER

This is a Continuation Application of Application Ser. No. 08/414,096, filed Mar. 31, 1995 now abandoned.

BACKGROUND OF THE INVENTION (1). Field of the Invention

The present invention pertains to communication between a computer and external peripheral devices over serial and parallel ports. More particularly, the invention relates to a method and an apparatus for attaching multiple logical peripheral devices to a single serial or parallel port and for multiple software applications to access these devices in an interleaved fashion.

(2) Prior Art

Typically, the connection between a computer and one or more peripheral devices is standardized as illustrated in FIGS. 1a–1c. The most common standard interfaces are serial ports and parallel ports. With the increase in the number of peripheral devices available for interfacing with a computer, a need to increase the interface capability between multiple applications running on the computer and the one or more peripheral devices has arisen.

From the computer point of view, the software running on the computer has become more sophisticated to accommodate the various external devices connected. Windows® for example is capable of detecting which application is using the computer's serial or parallel port. When more than one task is being performed on a computer at once, the operating system running on the computer, such as Windows®, attempts to monitor or keep track of who is using what resources. The operating system, for example, would not let two applications in the default state write to the same serial port unless this monitoring process was disabled.

Thus, the problem with existing interface techniques is that multiple applications running on a computer may only access the same peripheral device serially, one after the other. Therefore, the applications may not use the same peripheral device simultaneously or even in an interleaved or alternating mode since there is no method of identifying the data crossing the I/O port interfacing the applications with the peripheral devices.

FIG. 1a is a block diagram of an exemplary prior art system. Personal computer (PC) 100 has CPU 102 coupled to memory 104 and serial port 106 coupled to peripheral device 108, allowing communication between PC 100 and peripheral device 108.

FIG. 1b shows a conceptual flow of data between different layers of software, namely, BIOS 110, operating system 112 and application software 114 running on PC 100 referenced FIG. 1a without the implementation of the present invention. Each layer of software contains instructions which are executed on CPU 102 causing state changes in CPU 102 and in the contents of memory 104. Across the boundaries labeled C, D and E passes the flow of control of PC 100 as CPU 102 executes instructions from the different layers of software. At any given moment, CPU 102 is therefore executing a single stream of instruction from one layer of software or another.

Across boundary B, CPU 102 activates a peripheral circuitry to receive or transmit data from memory 104 to serial port 106 (parallel port or other peripheral devices), either directly or through internal registers of CPU 102. Across boundary A, data leaves PC 100 and is transmitted according to the I/O device being used, in this case serial port 106. A commonly used convention for serial ports include the IEEE standard RS-232 conventions. The data is then transmitted to an external peripheral device such as a modem.

Multiple software components may only access the same peripheral device serially, one after the other. Thus, as mentioned earlier, the components may not use the same peripheral device simultaneously or even in an interleaved or alternating mode since there is no method of identifying the data crossing boundary A. Similarly where only one physical device can be attached to the serial port (or the parallel port) at any given time, the components may not use the same peripheral device simultaneously or even in an interleaved or alternating mode for the same reasons.

FIG. 1c illustrates an example of the data flow to and from a communications application on PC 100 without the implementation of the present invention. In this illustration, the data flow to and from a communications application is to modem 102 for example. Communications application 114 performs a write using DOS services 112. Data may also be written by application 114 directly to serial port 106. This is in the case where the application communicates directly with the serial port hardware. In the case of the application receiving data from a peripheral device, the data sent from the peripheral device causes an interrupt request and the application interrupt handler reads the data from serial port 106.

There are variations to the prior art technique for accommodating the interface between applications running on a computer and peripheral devices coupled to the computer illustrated in FIGS 1a–1c. For example, Windows® has a user configurable time-out mechanism which prevents access by a second application accessing a serial port until seconds after the last access by a first application. The disadvantage of a user configurable time-out mechanism is that it does not allow multiple applications to run at the same time, nor does it allow multiple peripheral devices to be coupled to the same port.

Adapters are available from Logitech® which allow a scanner and a printer to be physically attached at the same time to a parallel port. However, these peripheral devices can not be operated at the same time. Furthermore, the peripheral devices must use proprietary software. A similar device is a Xircom® parallel port ethernet adapter. This device only allows one proprietary device to coexist with one standard parallel printer. In addition, there are devices which may be attached to a parallel port of a computer which implement "sound" functions. The software provided with these devices have no element of simultaneous support for multiple peripheral devices.

Typically, a computer may be coupled to a modem for communicating with an ordinary serial communications program such as Compuserv®, and a pager for communicating with a diary in order to, for example, record an appointment received by the pager. Thus, it is not only sufficient to handle the information going to an interface device from multiple sources but there is a need for a capability allowing for the computer to receive data from the interface device and to transmit the data to multiple applications on the computer.

A method and an apparatus for an interface device allowing the transmittal of different pieces of information to and from a computer to different applications running on the computer at the same time over a single serial or parallel port is desired. The desired method and apparatus would be able to support multiple proprietary and standard devices in many configurations.

BRIEF SUMMARY OF THE INVENTION

The present invention is a method and an apparatus for allowing communication of data between one or more peripheral devices coupled to a computer and one or more applications running on the computer in an interleaved fashion. The configuration of the physical port of the computer is read to determine what peripheral devices are attached to the computer. Logical ports are defined to the system based upon the physical configuration of the I/O port. The communication between the applications and the physical port is controlled using an envelope attached to the data being transmitted between the applications and the peripheral devices.

BRIEF DESCRIPTION OF THE DRAWINGS

FIG. 1b illustrates different layers of software running on PC 100 referenced in FIG. 1a.

FIG. 1c illustrates an example of the data flow between a communications application on PC 100 referenced in FIG. 1a.

DETAILED DESCRIPTION OF THE INVENTION

A method and apparatus for attaching multiple logical peripheral devices to a single serial or parallel port and for multiple unmodified software applications to access these devices in an interleaved fashion is disclosed in the following description.

Figure 1A:
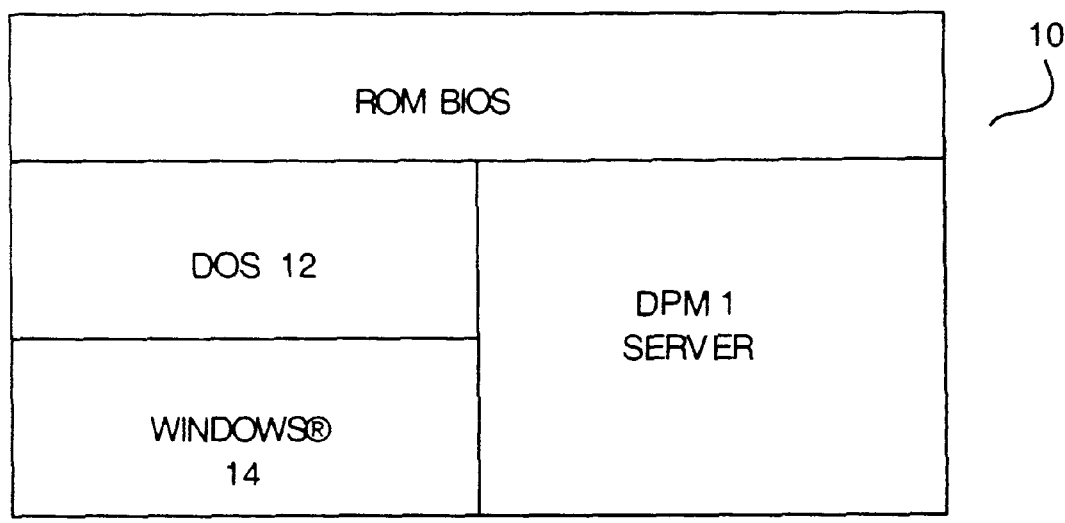
FIG. 1a is an exemplary prior art system block diagram.
Figure 1B:
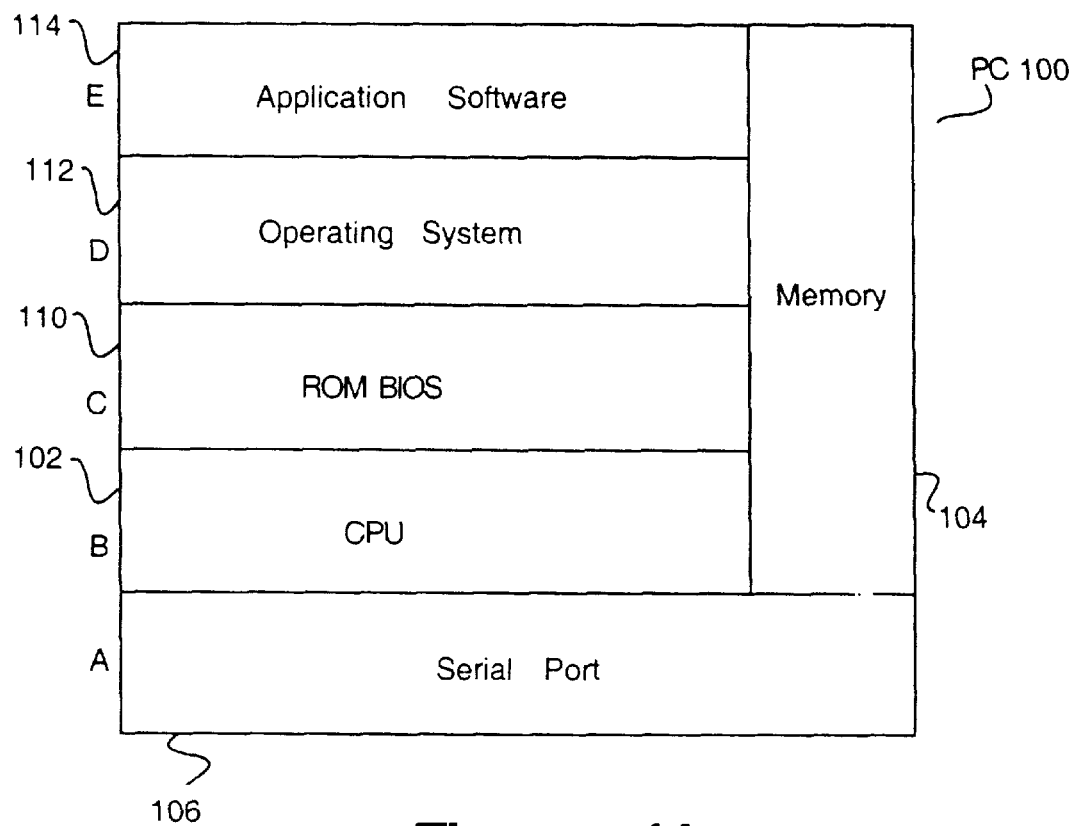
Figure 1C:
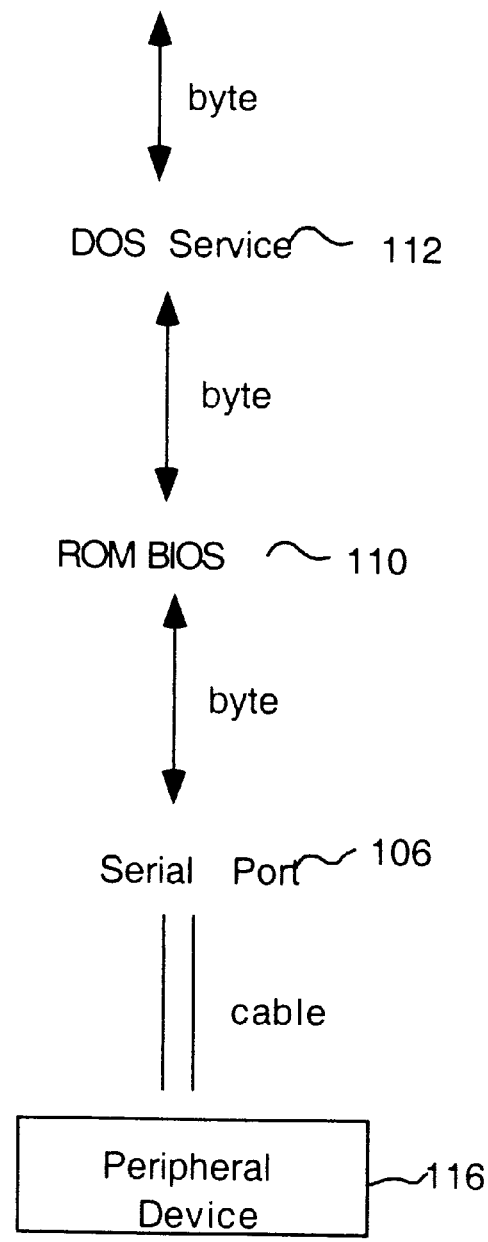
Figure 2A:
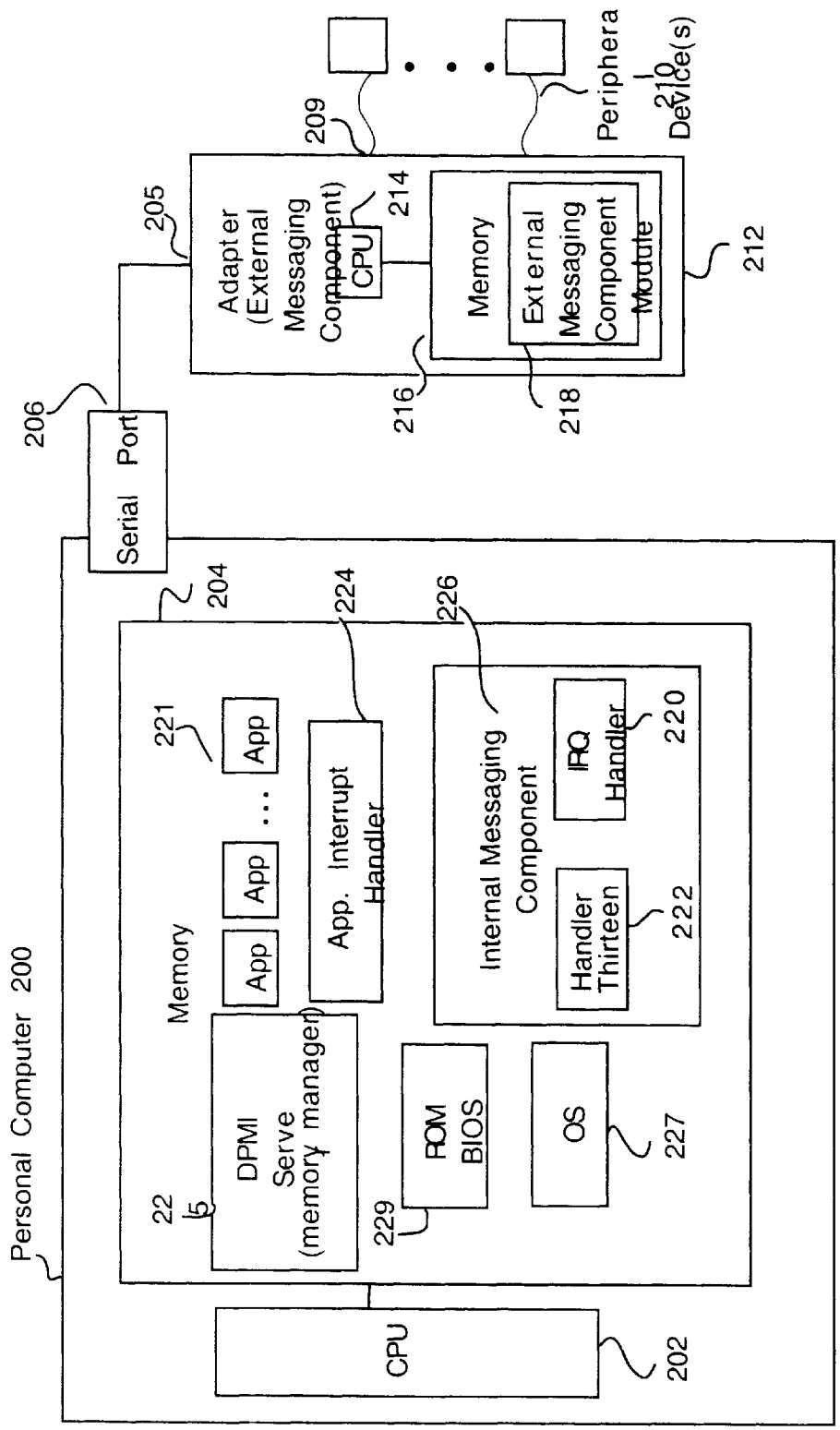
FIG. 2a illustrates an exemplary system block diagram illustrating an embodiment of the system of the present invention.

FIG. 2a illustrates an exemplary system block diagram illustrating an embodiment of the system of the present invention. Personal computer (PC) 200 with CPU 202 and memory 204 has serial port 206 coupled to adapter 212 for communicating with external peripheral devices 210. Adapter 212 coupled to PC 100 may also be built into one peripheral device 210, with other peripheral devices 210 coupled to adapter 212. Memory 204 has operating system 227, ROM BIOS 229 and DPMI (DOS Protected Mode Interface) server 225.

Various applications 221 running on PC 200 reside in memory 204. These multiple unmodified software applications 221 may perform read and write operations to peripheral devices 210. I/O Interface 226 coordinates the interface between the multiple applications 221 with multiple peripheral devices 210 coupled to PC 200 via adapter 212. Since PC 200 only has one physical serial port 206, in order to allow these applications 221 to communicate with peripheral devices 210 in an interleaved or alternating mode, the present invention's internal messaging component 226 defines logical serial ports (which may be defined as com2, com3, com4, . . . ) to the system for peripheral devices 210 attached to PC 200 via adapter 212 and serial port 206.

Memory 204 also has interrupt request (IRQ) handler 220, and handler 222 for handling I/O related operations through serial port 206 between applications 221 and peripheral devices 210. The general steps followed by IRQ handler 220 and handler 222 will be described in more detail in the description accompanying FIGS. 5 through 8. Application interrupt handler 224 is used by applications 221 running on PC 200 during normal operation.

The implementation of the present invention may be used with an Intel® X86 architecture, for example, in a way that is compatible with standard system software (i.e. DOS and Windows®), providing a method for attaching multiple logical peripheral devices 210 to a single serial or parallel port 206, and similarly for multiple unmodified software applications to access these devices 210 in an interleaved fashion.

No changes to the application software are required to work with standard peripheral devices. More specifically, the invention allows simulation in software of redirection of data flow to and from serial ports, parallel ports and other hardware devices which are addressed by writing to an I/O space of, for example, an Intel® x86 processor, without any changes to the application software.

The portion of the invention internal to PC 200 (e.g. internal messaging component 226) may be implemented using software means only. The portion of the invention external to PC 200 (e.g. adapter 212) consists of software and hardware. If one of the peripheral devices to be attached to PC 200 already contains a suitable system platform (e.g. CPU 214 and memory 216) for running software (e.g. external messaging component module 218) and suitable hardware (e.g. communications ports 205 and 209 to PC 200 and for additional peripheral devices) then the invention may utilize the existing hardware. External messaging component module 218, like internal messaging component 226, coordinates the interface between multiple applications 221 with multiple peripheral devices 210.

Figure 2B:
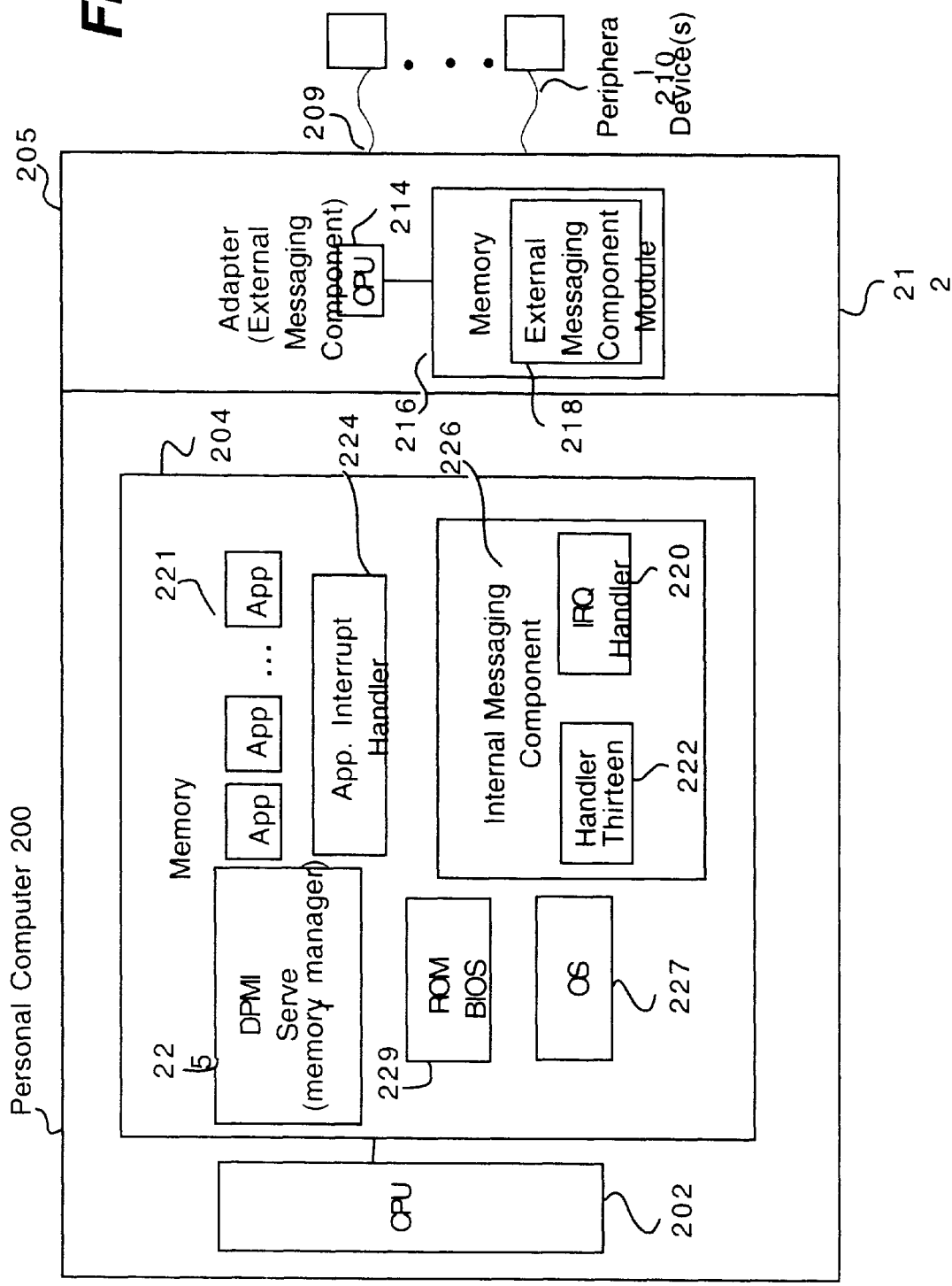
FIG. 2b illustrates an exemplary alternate embodiment of the system of the present invention.

FIG. 2b illustrates an exemplary alternate embodiment illustrating the system of the present invention. In an alternate embodiment, a single physical device 211 attached or built onto PC 200 may perform multiple functions for PC 200 coupled with multiple peripheral devices 210 interacting simultaneously with multiple applications 221.

Figure 3:
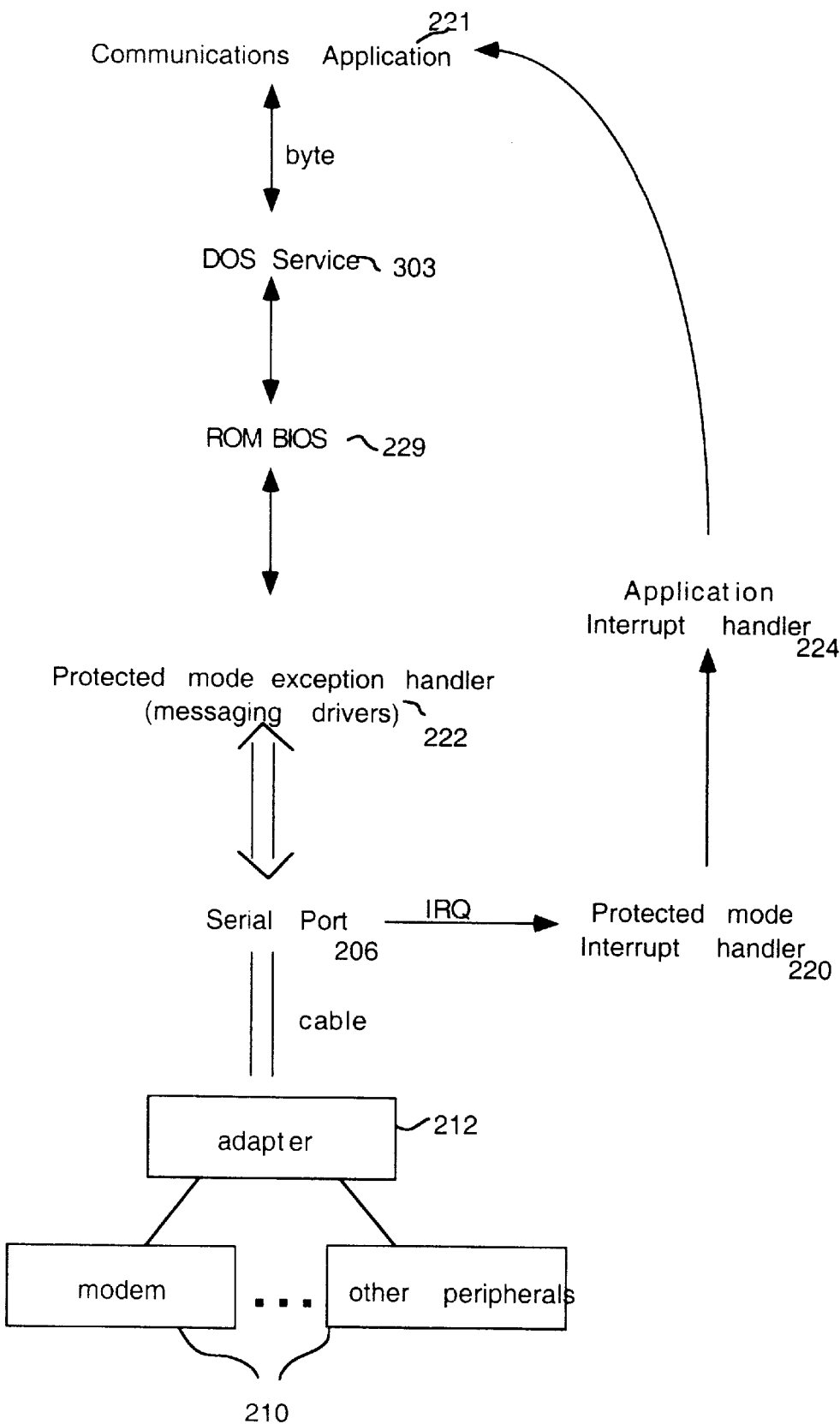
FIG. 3 illustrates the flow of data using the present invention.

FIG. 3 illustrates an exemplary flow of data between applications 221 running on PC 200 and peripheral devices 210 coupled to PC 200 using the present invention. Application 221 writes using DOS service 303. There is a messaging component on both sides of the actual peripheral communication link, serial or parallel port 206.

External messaging component 218 may be implemented as a feature in an appropriate peripheral device, or as a stand alone box offering one connection to the computer and several connections to peripheral devices 210. This external messaging component may consist of software and hardware to multiplex and demultiplex the data flowing across the peripheral communication link using standard techniques. In addition, as mentioned earlier, internal messaging component 226, may be implemented in software only. A more detailed description of the general steps followed by the messaging components and the general flow of data between the communication applications and the peripheral devices will be described in the descriptions accompanying the flow charts illustrated in FIGS. 5 through 8.

Figure 4:
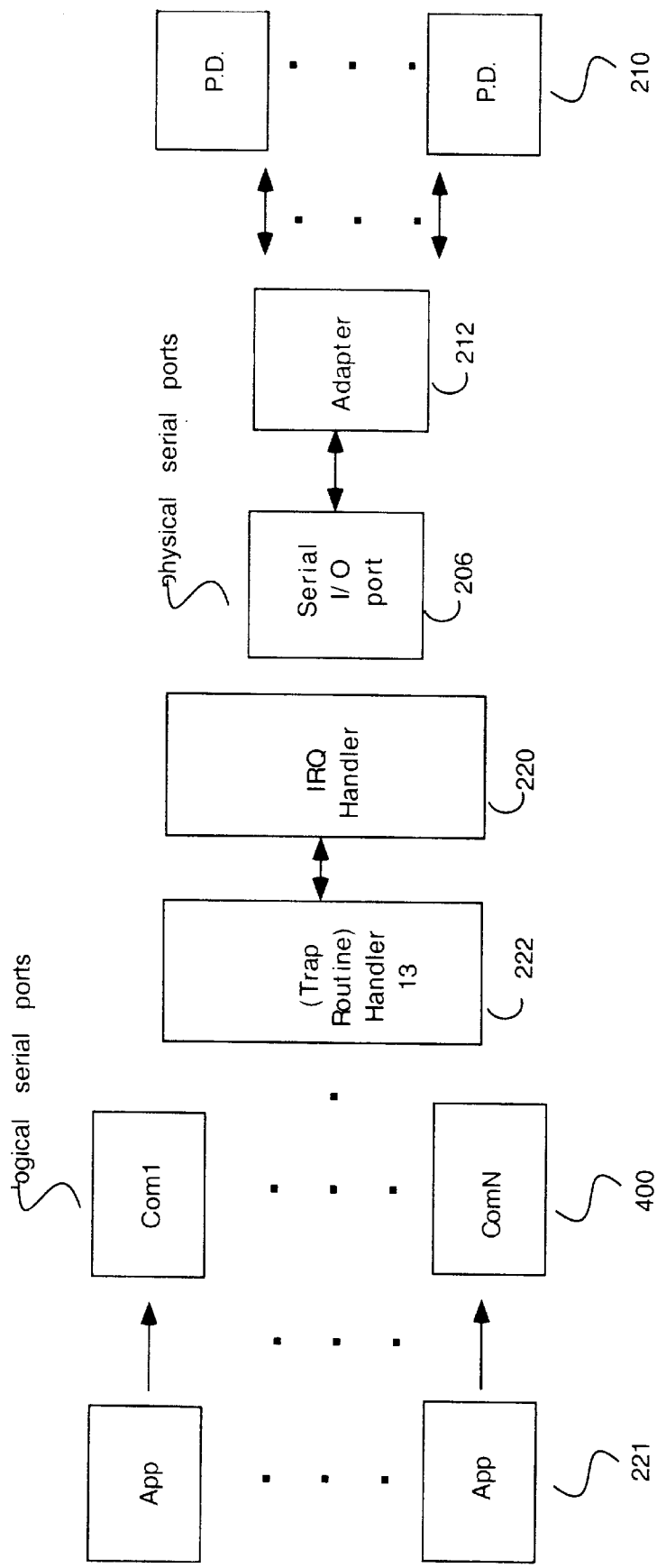
FIG. 4 illustrates another representation of the flow of data using the present invention.

FIG. 4 illustrates an alternate representation of the flow of data between applications 221 and peripheral devices 210 using the present invention. Applications 221 attempts to perform read and/or write operations to peripheral devices 210 through logical serial ports coml through comN 400. As soon as any one of application 221 attempts the read and/or write operation, a trap routine, handler thirteen 222 takes over the flow of control of the operation and processes the necessary read or/write operation requested by one of applications 221. If internal messaging component 226 installs IRQ handler 220, then whenever peripheral devices 210 transmit data (with an envelope) via adapter 212 and serial I/O port 206, serial I/O port 206 invokes an interrupt after receiving the message. In addition, IRQ handler 220 takes over the processing of the message.

Figure 5:
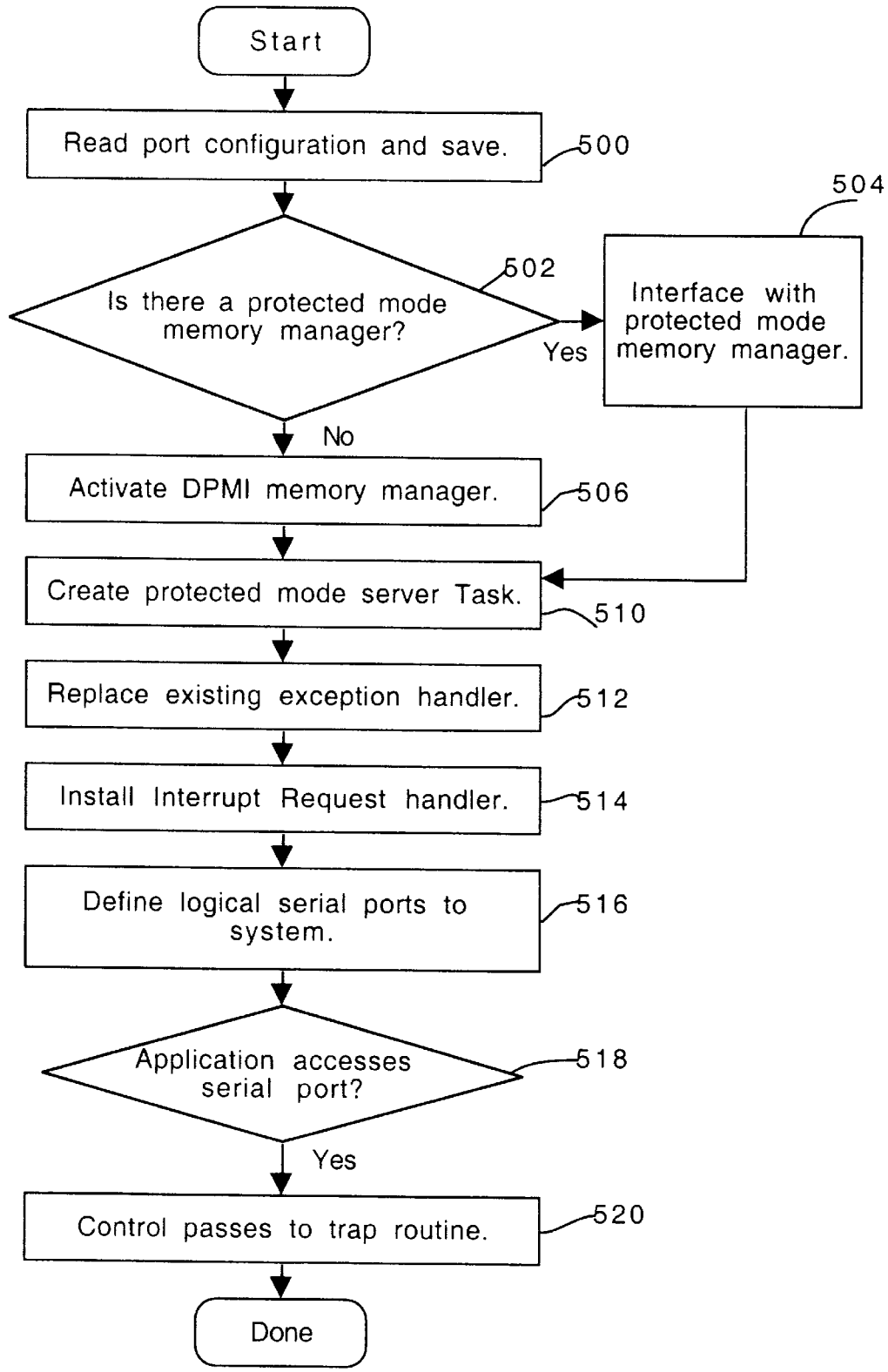
FIG. 5 is a flow diagram illustrating the general steps followed by the internal messaging component of the present invention.

FIG. 5 illustrates the general steps followed by the present invention in trapping applications 221's read and write operations to a logical serial port (e.g. coml~comN). In step 500, the configuration of physical port 206 of PC 200 coupled to various peripheral devices 210 is read and saved in memory 204 of PC 200. In step 502, if there is an existing protected mode memory manager on the computer, the internal messaging component interfaces to the existing protected mode memory manager using standard VCPI (Virtual Control Program Interface) or DPMI API (Dos Protected Mode Interface Application Program Interface) calls in step 504. Typically Intel x86 family based systems run a protected mode memory manager together with an operating system, such as the EMM386.exe program which is supplied with MS DOS®, or QEMM®. DPMI and VCPI are published standard interfaces for memory managers which support and mediate sharing of memory above 1 MB by application programs.

If there are no existing protected mode memory managers, then in step 506, the CPU activates a DPMI memory manager such as the DPMI memory manager built into Windows®. In step 510, CPU 202 creates a protected mode server Task with I/O bit set to cause trapping of all read/write attempts by applications 221 to serial ports 206. A person skilled in the art will readily understand the method by which a CPU creates the protected mode server task. In step 512, internal messaging component 226 replaces existing exception 13 handler, with handler thirteen 222 (described in more detail in the text accompanying FIGS. 6a and 6b).

Figure 7:
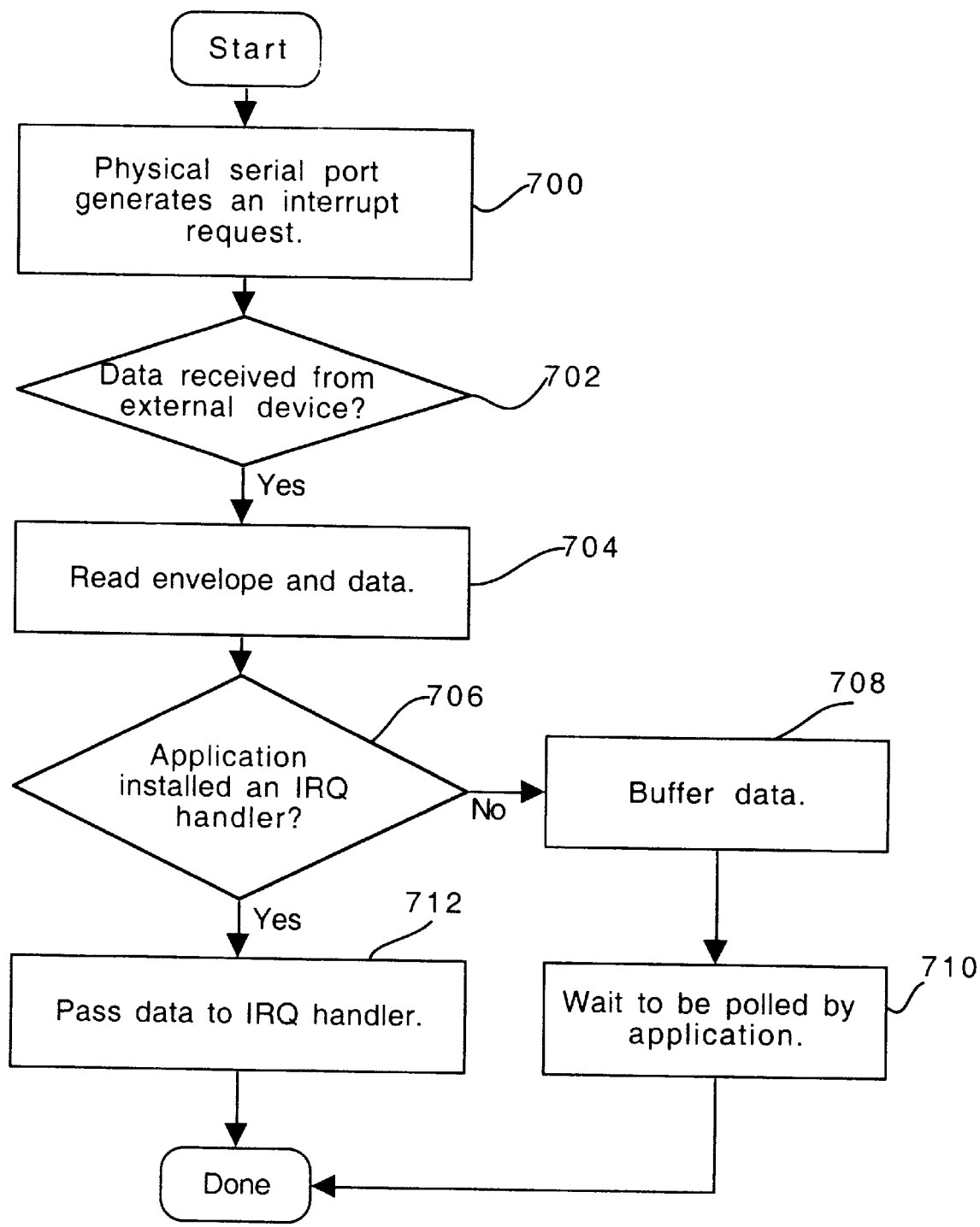
FIG. 7 is a flow diagram illustrating the general steps followed by the IRQ handler of the present invention.

In step 514, internal messaging component 226 installs handlers for an appropriate Interrupt Request (IRQ) (described in more detail in the description accompanying FIG. 7). Internal messaging component 226 then becomes prepared to handle interrupts from serial port 206. Thus, whenever application 221 attempts to perform a write or a read to peripheral device 210, a trap routine of a handler (handler thirteen 222 or IRQ handler 220) interrupts the flow of data allowing the appropriate handler to perform its handler routine.

In step 516, internal messaging component 226 defines simulated logical serial ports 400 (e.g. com2, com3, com4) to the system for additional peripheral devices 210 attached through physical serial port 206. A person skilled in the art and with the knowledge of the method and apparatus of the present invention may readily understand the method by which logical serial ports 400 may be defined to the system. In step 518, when application 221 accesses serial port 206, the flow of control of data passes to a trap routine, handler thirteen 222 or IRQ handler 220, in step 520, further described in the descriptions accompanying FIGS. 6a through 6c and FIG. 7.

With the present invention, every time an application attempts to access a peripheral device, a trap routine is invoked and the operation initiated by the application (such as a read or a write operation between the application and the peripheral device) is processed. When more than one application attempts to access the same peripheral device, then each application's attempt invokes a trap routine allowing for the processing of each application's read or write request to be processed in an interleaved fashion. As mentioned earlier, a more detailed description of the general steps followed by the trap routines are described in the text accompanying FIGS. 6a–6c and 7.

Figure 6A:
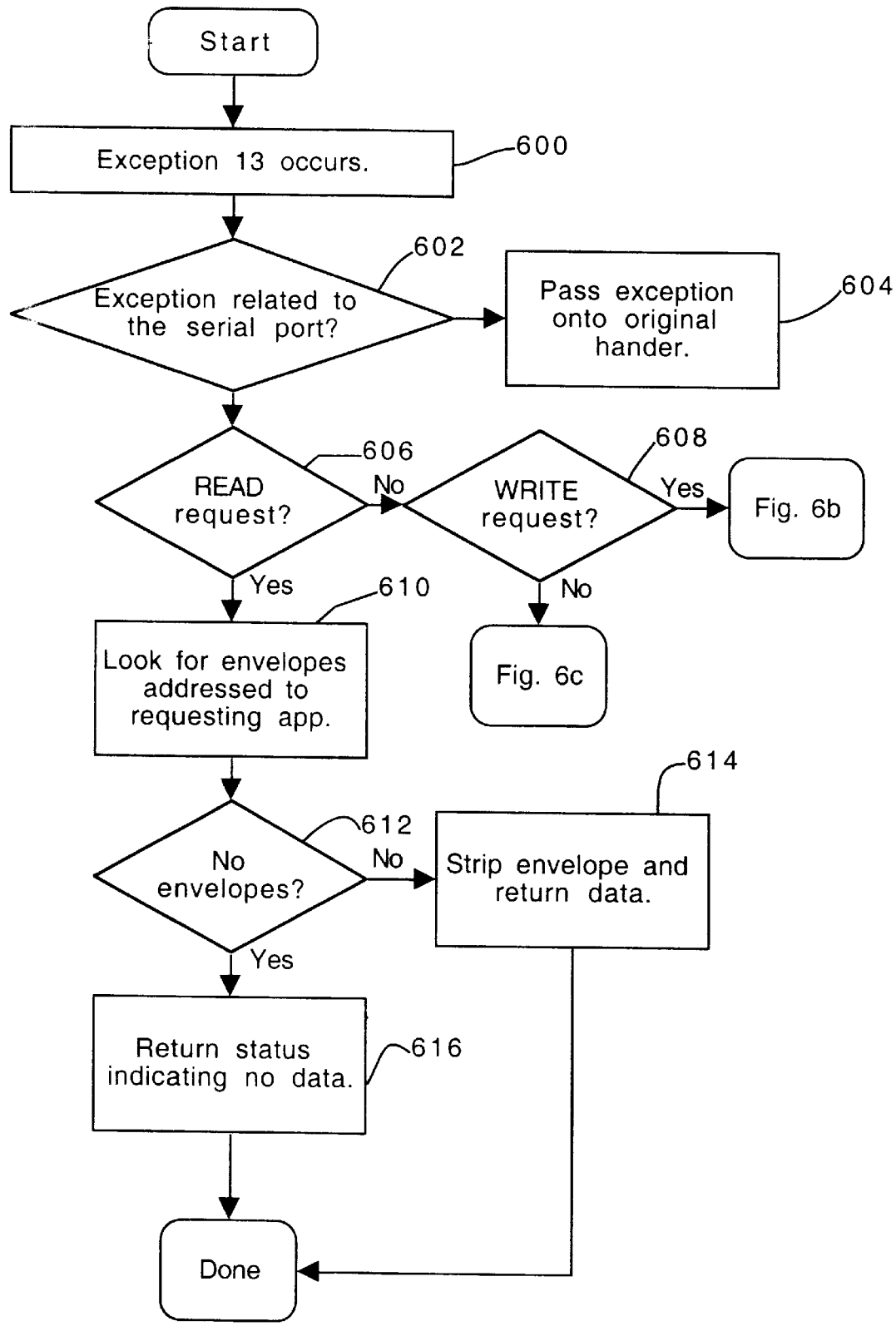
FIG. 6a through 6c are flow diagrams illustrating the general steps followed by the handler 13 of the present invention.
Figure 6B:
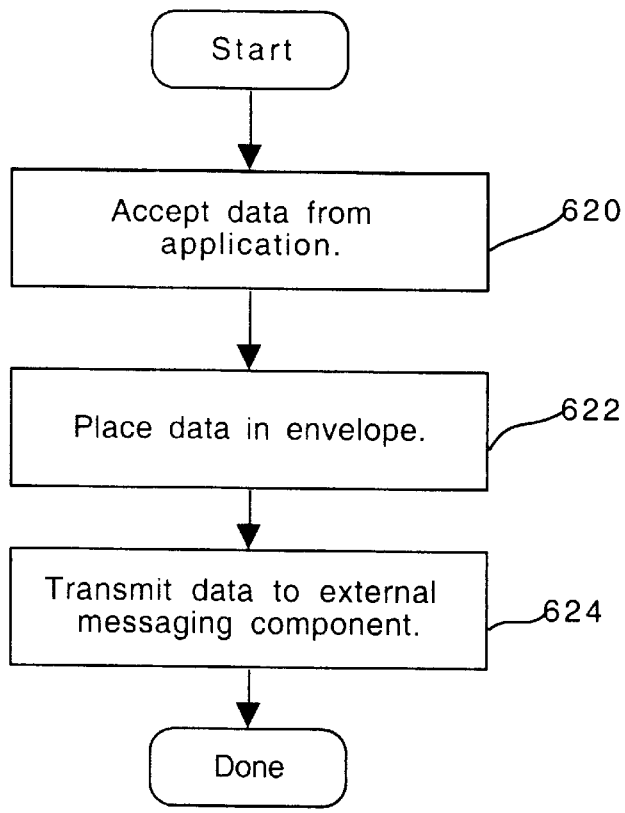
Figure 6C:
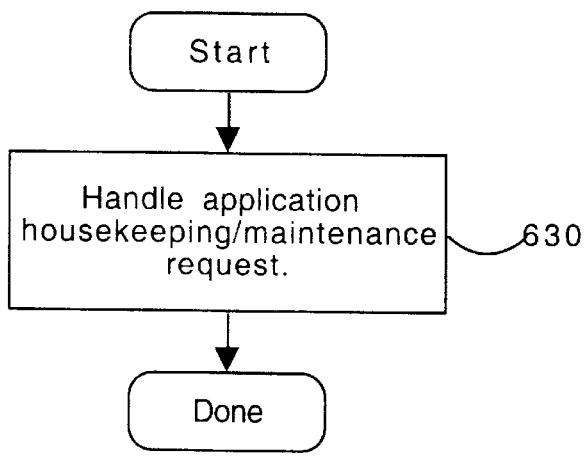

FIG. 6a illustrates the general steps followed by the exception handler thirteen 222 of the present invention. In step 600 an exception occurs (for example, an exception thirteen on an Intel® x86 processor). In step 602, the exception is parsed and determined if the exception is related to serial I/O port 206. In step 604, if the exception is not related to serial I/O port 206 then in step 604, the exception is passed onto the original exception handler for normal processing of the exception. Otherwise, if the exception is related to serial I/O port 206, then in step 606, the exception is examined if it is a read request to peripheral device 210 by one of applications 221 running on PC 100. If it is a read request, then in step 610, envelopes received from peripheral device 210 are examined if they are addressed to one of applications 221 which made the read request. An envelope typically refers to a portion of data being transmitted electronically between two components of a system such as peripheral device 210 and application 221. An envelope may contain information used in the transmission of the data including the length of the data, the destination of the data and the source of the data.

In step 612, if envelopes are not found in serial I/O port 206, then in step 616, status indicating no data is returned to the requesting application 221 (i.e. application 221 attempting to perform a read of data from peripheral device 210). Otherwise if envelopes addressed to the requesting application 221 are available, then in step 614, the envelope is stripped and the data is returned to the requesting application 221.

Back in step 606, if the exception is not triggered by a read request but by a write request by application 221 to peripheral device 210, then in steps 608 and 620, the data from application 221 is accepted. In step 622, the data is placed in an envelope to be transmitted to the appropriate peripheral device 210. Thus, in a write operation by application 221, the data is encapsulated in an envelope with a header which identifies the source application 221 and the destination peripheral device 210 as well as the length of the data being transmitted.

In step 624, the data is then transmitted across the serial I/O port to the external messaging component (such as may be incorporated in adapter 212 coupled to peripheral devices 210). If the exception is neither triggered by a read request nor by a write request, but is related to serial I/O port 206, then in step 630, the exception thirteen is determined to be an attempt to install an IRQ handler for the logical or physical serial port, or other housekeeping and maintenance operations required by the application (e.g. setting the serial port mode of operation).

FIG. 7 illustrates the general steps followed upon an IRQ (i.e. an interrupt request). In step 700, when physical serial port 206 generates an interrupt request (IRQ), if data is received from peripheral device 210 in step 702, then in step 704, the envelope and the data is read from serial port 206. In step 706, if the internal messaging component 226 had installed an IRQ handler, then in step 612, the data is passed to IRQ handler 220 which reads the data from serial I/O port 206 for application 221. Otherwise, in step 608, the data is buffered. In step 610, the data remains in the serial I/O port buffer until it is polled by application 221.

Figure 8:
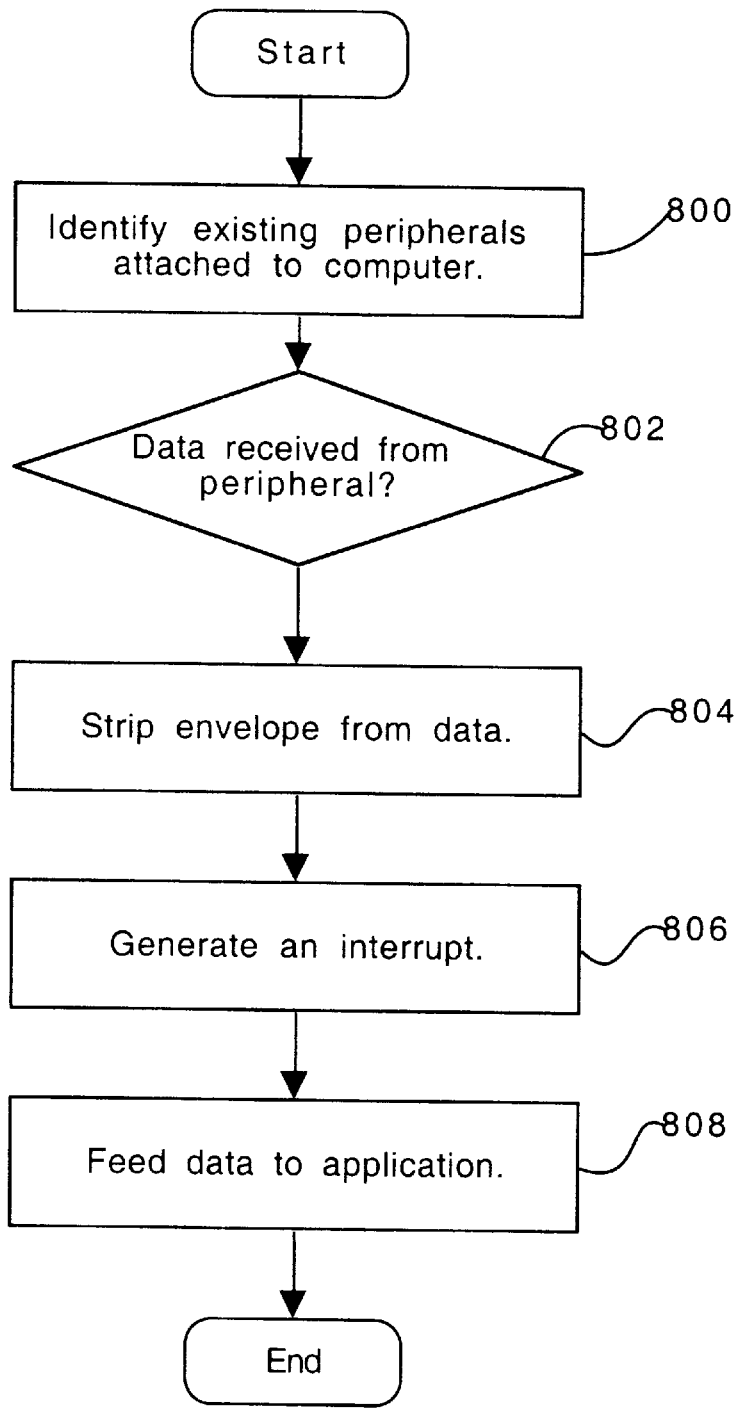
FIG. 8 is a flow diagram illustrating the general steps followed by the messaging component on a peripheral device or an adapter of the present invention.

FIG. 8 illustrates the general steps followed by the external messaging components (e.g. adapter 212). In step 800, external messaging component module 218 on a peripheral device or adapter 212, identifies existing peripheral devices 210 attached to adapter 212 at start-up time, or through a control message received from physical serial port 206 of PC 200. In step 802, when data is received from peripheral device 210 through physical serial port 206, physical serial port 206 causes an interrupt request (IRQ). If an IRQ handler was installed by internal messaging component 226, IRQ handler 220 takes over the flow of control of the operation.

Under the control of IRQ handler 220, the envelope attached to the data is stripped from the data in step 804. In step 806, a trap is generated for the appropriate logical serial port 400. This trap is generated using the information in the header of the envelope to identify the appropriate application 221 running on PC 200 which is to receive the information. In step 808, data is then fed to application 221 running on PC 200 as though data had been received through logical serial port 400 (previously defined by internal messaging component 226 to the system). External messaging component module 218 therefore puts data originating in peripheral device 210 into an envelope and transmits it to PC 100. Similarly, external messaging component module 218 extracts data from incoming envelopes and passes the data to the appropriate peripheral device 210, using the envelope's addressing information.

As mentioned earlier, the present invention provides for the great advantage of allowing more than one peripheral device to be attached to a single serial or parallel port, without making changes to the application software supporting the device, and in some embodiments, without modification of the peripheral device. The present invention also allows for more than one application running on a computer to communicate with the same peripheral device in an interleaved fashion.

What has been described is an apparatus and method for attaching multiple logical peripheral devices to a single serial or parallel port and for multiple software applications to access these devices in an interleaved fashion.

While certain exemplary embodiments have been described in detail and shown in the accompanying drawings, it is to be understood that such embodiments are merely illustrative of and not restrictive on the broad invention and that this invention is not to be limited to the specific arrangements and constructions shown and described since various other modifications may occur to those of ordinary skill in the art. For example, although illustrated embodiments were for serial ports, similar procedures are applicable in implementing the invention for the sharing of parallel ports.

What is claimed:

1. A method for allowing communication of data between one or more peripheral devices and one or more applications running on a computer, the one or more peripheral devices being coupled to the computer through one or more physical I/O ports, said method comprising the steps of:

reading the configuration of the one or more physical I/O ports of the computer running the one or more applications;

defining logical I/O ports to the computer based upon the number of the one or more peripheral devices being coupled to the computer, said number determined by said reading of the configuration of the one or more physical I/O ports; and communicating the data between the one or more applications and the one or more peripheral devices through said logical I/O ports and the one or more physical I/O ports using an envelope attached to the data.

2. The method of claim 1 further comprising the step of controlling said communication between the one or more applications and the one or more peripheral devices using an envelope attached to the data allowing for more than one application to communicate with the same peripheral device in an interleaved fashion.

3. The method of claim 2 further comprising the step of interfacing with a protected mode memory manager.

4. The method of claim 2 further comprising the step of activating a DPMI memory manager.

5. The method of claim 2 further comprising the step of creating a protected mode server task.

6. The method of claim 5 further comprising the step of replacing an existing exception handler with a replacement exception handler for taking over flow of control when said one or more applications attempt to read or write to said one or more peripheral devices.

7. The method of claim 6 further comprising the step of installing an interrupt request handler for stripping an envelope attached to data transmitted between said one or more applications and said one or more peripheral devices and determining destination of said data according to information in said envelope.

8. The method of claim 7 further comprising the step of defining logical serial ports to the computer.

9. The method of claim 8 further comprising the step of determining whether the one or more applications are accessing the physical I/O port.

10. The method of claim 9 further comprising the step of passing flow of control to a trap routine if the one or more applications are attempting to access the physical I/O port.

11. The method of claim 10 further comprising the step of looking for an envelope addressed to a requesting one or more applications if the one or more applications is attempting a read request to the one or more peripheral devices.

12. The method of claim 11 further comprising the step of returning status indicating no data to the requesting one or more applications if there are no envelopes.

13. The method of claim 12 further comprising the step of stripping said envelope and returning data if said envelope addressed to the requesting one or more applications is found.

14. The method of claim 13 further comprising the steps of:

accepting data from said one or more applications if the one or more applications is attempting a write request to the one or more peripheral devices;

placing said data in an envelope; and transmitting said data to an external messaging component.

15. The method of claim 14 further comprising the step of handling application housekeeping and maintenance requests if the one or more applications are not attempting to perform a read request or a write request.

16. An apparatus for allowing communication of data between one or more peripheral devices and one or more applications running on a computer, the one or more peripheral devices being coupled to the computer, said apparatus comprising:

an internal messaging component for controlling said communication between said one or more applications and said one or more peripheral devices using an envelope attached to said data being communicated;

a memory manager for supporting and mediating sharing of memory by said one or more applications communicating with said one or more peripheral devices when said internal messaging component is controlling said communication; and an operating system coupled to said memory manager and said internal messaging component, said operating system running on said computer.

17. The apparatus of claim 16 further comprising an exception handler for taking over flow of control when said one or more applications attempt to read or write to said one or more peripheral devices.

18. The apparatus of claim 16 further comprising an interrupt request handler for stripping an envelope attached to data transmitted between said one or more applications and said one or more peripheral devices and determining destination of said data according to information in said envelope.

19. The apparatus of claim 16 further comprising an adapter coupleable to the computer through a physical port of the computer.

20. The apparatus of claim 19 further comprising an external messaging component module for determining which appropriate said one or more peripheral devices to transmit data received from said one or more applications running on the computer using said envelope.

21. An apparatus for allowing communication of data between one or more peripheral devices and one or more applications running on a computer, the one or more peripheral devices being coupled to the computer, said apparatus comprising:

means for controlling communication between said one or more applications and said one or more peripheral devices using an envelope attached to said data; and means for supporting and mediating sharing of memory by said one or more applications communicating with said one or more peripheral devices while said means for controlling communication is active.

22. The apparatus of claim 21 further comprising:

means for taking over the flow of control when said one or more applications attempt to read or write to said one or more peripheral devices; and means for stripping an envelope attached to data transmitted between said one or more applications and said one or more peripheral devices and determining destination of said data according to information in said envelope.

23. The means of claim 22 further comprising means coupleable to the computer through a physical port of the computer.

24. The means of claim 23 further comprising means for determining which appropriate said one or more peripheral devices to transmit data received from said one or more applications running on the computer using said envelope.

25. A computer system for allowing communication of data between one or more peripheral devices and one or more applications running on a computer, the one or more peripheral devices being coupled to the computer, said system comprising:

an internal messaging component for controlling said communication between said one or more applications and said one or more peripheral devices using an envelope attached to said data being communicated;

a memory manager for supporting and mediating sharing of memory by said one or more applications communicating with said one or more peripheral devices when said internal messaging component is controlling said communication;

an operating system coupled to said memory manager and said internal messaging component, said operating system running on the computer; and a processor for running said operating system.

26. The computer system of claim 25 further comprising an exception handler for taking over the flow of control when said one or more applications attempt to read or write to said one or more peripheral devices.

27. The computer system of claim 25 further comprising an interrupt request handler for stripping an envelope attached to data transmitted between said one or more applications and said one or more peripheral devices and determining destination of said data according to information in said envelope.

28. The computer system of claim 25 further comprising an adapter coupleable to the computer through a physical port of the computer.

29. The computer system of claim 27 further comprising an external messaging component module for determining which appropriate said one or more peripheral devices to transmit data received by said one or more applications running on the computer.

30. A computer system for allowing communication of data between one or more peripheral devices and one or more applications running on a computer, the one or more peripheral devices being coupled to the computer, said system comprising:

means for controlling communication between said one or more applications and said one or more peripheral devices using an envelope attached to said data; and means for supporting and mediating sharing of memory by said one or more applications communicating with said one or more peripheral devices while said means for controlling communication is active.

31. The computer system of claim 30 further comprising:

means for taking over the flow of control when said one or more applications attempt to read or write to said one or more peripheral devices; and means for stripping an envelope attached to data transmitted between said one or more applications and said one or more peripheral devices and determining destination of said data according to information in said envelope.

32. The computer system of claim 30 further comprising means coupleable to the computer through a physical port of the computer.

33. The computer system of claim 31 further comprising means for determining which appropriate said one or more peripheral devices to transmit data received by said one or more applications running on the computer.

* * * * *